US009122264B2

(12) United States Patent
Weddle et al.

(10) Patent No.: US 9,122,264 B2
(45) Date of Patent: Sep. 1, 2015

(54) DETECTION OF INDUCTIVE COMMUNICATION FOR PROGRAMMABLE LOGIC CONTROLLER DIAGNOSIS

(75) Inventors: Robert Alan Weddle, Johnson City, TN (US); James F. Archer, Gray, TN (US)

(73) Assignee: Siemens Aktiengesellschaft, München (DE)

( * ) Notice: Subject to any disclaimer, the term of this patent is extended or adjusted under 35 U.S.C. 154(b) by 680 days.

(21) Appl. No.: 13/399,893

(22) Filed: Feb. 17, 2012

(65) Prior Publication Data
US 2013/0218521 A1 Aug. 22, 2013

(51) Int. Cl.
*G06F 9/00* (2006.01)
*G05B 19/05* (2006.01)
*G05B 19/406* (2006.01)

(52) U.S. Cl.
CPC ............ *G05B 19/058* (2013.01); *G05B 19/406* (2013.01)

(58) Field of Classification Search
CPC .. G01R 31/024; G01R 31/025; G01R 31/026; H01F 7/1844; G05B 19/054; G05B 19/058; G05B 19/406; G05B 19/4063; G05B 19/425; G05B 2219/14058; G05B 2219/14065; G05B 219/14006; G05B 2219/14056; G05B 2219/14112; G05B 2219/21026; G05B 2219/31211

USPC .......................................................... 700/26
See application file for complete search history.

(56) References Cited

U.S. PATENT DOCUMENTS

| 4,635,214 | A | * | 1/1987 | Kasai et al. ................... 702/183 |
| 4,932,246 | A | | 6/1990 | Deutsch et al. |
| 5,097,470 | A | * | 3/1992 | Gihl ................................ 714/55 |
| 5,304,935 | A | * | 4/1994 | Rathke et al. ................. 324/415 |
| 5,384,539 | A | | 1/1995 | Morbe et al. |
| 7,623,326 | B2 | | 11/2009 | Schwenkel et al. |
| 2001/0039649 | A1 | | 11/2001 | Boggs et al. |
| 2002/0169582 | A1 | * | 11/2002 | Eryurek et al. ............... 702/183 |
| 2009/0063739 | A1 | | 3/2009 | Weddle |
| 2009/0072809 | A1 | * | 3/2009 | Kaltenegger et al. ...... 324/76.11 |
| 2009/0273350 | A1 | | 11/2009 | Archer et al. |
| 2011/0210688 | A1 | | 9/2011 | Dooley et al. |

OTHER PUBLICATIONS

PCT Search Report for PCT/US2013/026415, dated Jul. 1, 2013 (11 pages).
Mitsubishi Programmable Controllers Hardware Manual, "FX3U Series Programmable Controllers," Nov. 2005, pp. 1-8.

* cited by examiner

*Primary Examiner* — John Breene
*Assistant Examiner* — Timothy H Hwang

(57) ABSTRACT

Inductive commutation is detected for programmable logic controller (PLC) diagnosis. By detecting the inductive commutation, the need for any delay may be determined. Where the load is not inductive, the diagnostic may be performed with little or no delay.

20 Claims, 3 Drawing Sheets

DETECTION OF INDUCTIVE COMMUNICATION FOR PROGRAMMABLE LOGIC CONTROLLER DIAGNOSIS

BACKGROUND

The present embodiments relate to diagnostics for programmable logic controllers (PLCs).

PLCs control automated processes, such as controlling operations in a factory. A PLC connects with one or more loads, such as motors, actuators, and/or sensors. The connections allow control of the loads by the PLC. However, the connection and/or the load may fail. For example, a wire becomes disconnected or shorted to ground or a high voltage. To deal with possible connection problems, self-contained diagnostic circuitry is included in the PLC.

False diagnostics are to be avoided, as a false diagnostic may unnecessarily shut down a process. However, inductive loads may cause false diagnostics. When a switching output is connected to an inductive load, there is an energy transfer as the output switches to the off state. This energy transfer disrupts the diagnostic circuitry until the energy has been dissipated. This inductive commutation may cause false diagnostic events to be detected.

To avoid false diagnostic events, the diagnostic detection is performed only after a delay the energy to fully dissipate. The delay is based on a maximum possible inductance to be connected with the output. This wait occurs whether an inductive load is present or not and whether the inductive load has a maximum inductance or not. As a result, delay is introduced in the control and/or diagnostic process.

SUMMARY

Systems, methods and non-transitory computer readable media are provided for detection of inductive commutation for programmable logic controller (PLC) diagnosis. By detecting the inductive commutation, the need for any delay may be determined. Where the load is not inductive, the diagnostic may be performed with little or no delay.

In a first aspect, a system is provided for detection of inductive commutation for programmable logic controller (PLC) diagnosis. An output driver connects with an output of the PLC. A diagnostic detection circuit is connectable or connects with the output. An inductive commutation detection circuit connects with the output. The inductive commutation detection circuit is operable to detect the inductive commutation when the output driver turns off. A processor is configured to delay reading of the diagnostic detection circuit in response to the detection of the inductive commutation and to initiate the reading of the diagnostic detection circuit when the inductive commutation detection circuit detects no inductive commutation.

In a second aspect, a method is provided for detection of inductive commutation for programmable logic controller (PLC) diagnosis. An output to a load is transitioned from a high state to a low state. The output is checked for inductive commutation in response to the transitioning. A diagnostic of the output is measured after the checking. The measured diagnostic is processed. The measuring, the processing, or the measuring and the processing are delayed when there is inductive commutation at the output, and the processing of the measured diagnostic is performed without the delaying when there is substantially no inductive commutation at the output.

In a third aspect, a method is provided for detection of inductive commutation for programmable logic controller (PLC) diagnosis. An output of the PLC switches off. A voltage level from a load at the output of the PLC is detected in response to the switching off. Diagnosis of connection of the output to the load is timed as a function of the voltage level.

Any one or more of the aspects described above may be used alone or in combination. These and other aspects, features and advantages will become apparent from the following detailed description of preferred embodiments, which is to be read in connection with the accompanying drawings. The present invention is defined by the following claims, and nothing in this section should be taken as a limitation on those claims. Further aspects and advantages of the invention are discussed below in conjunction with the preferred embodiments and may be later claimed independently or in combination.

BRIEF DESCRIPTION OF THE DRAWINGS

The components and the figures are not necessarily to scale, emphasis instead being placed upon illustrating the principles of the embodiments. Moreover, in the figures, like reference numerals designate corresponding parts throughout the different views.

DETAILED DESCRIPTION OF EMBODIMENTS

Inductive commutation is detected to enhance diagnostic performance. The reporting or measuring of a diagnostic may be ignored until the energy is fully or substantially dissipated. "Substantially" allows for less than all energy being dissipated but enough that the diagnostic is not false. In one embodiment, a wait period is used, but only when an inductive load is applied to the output. In this way, when a non-inductive load is attached, the module detects the diagnostics at full switching speed. When an inductive load is attached, the switching speed is reduced to allow energy to be dissipated. The diagnostics may then be detected after the energy is dissipated and within a cycle time of the output.

Figure 1:
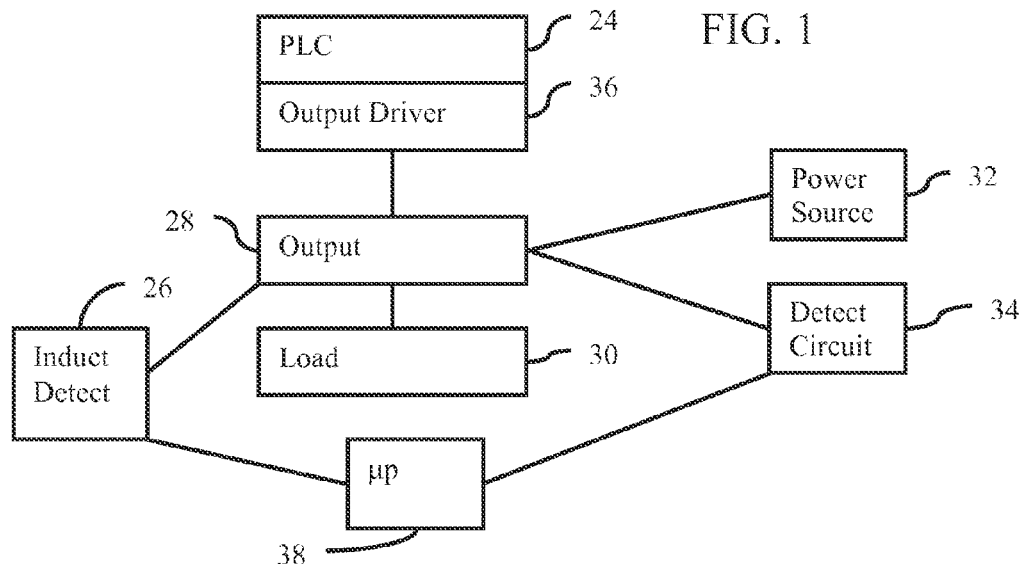
FIG. 1 is a block diagram of one embodiment of a system for detection of inductive commutation for programmable logic controller (PLC) diagnosis.
Figure 2:
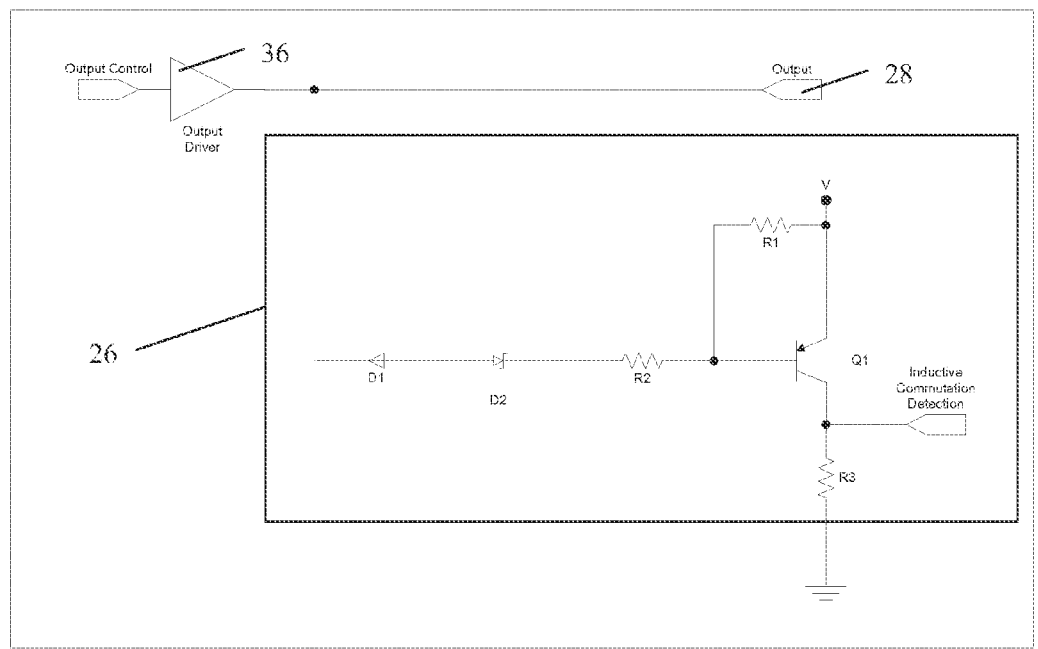
FIG. 2 is a circuit diagram of an example embodiment of the system of FIG. 1.

FIG. 1 shows a block diagram of a system for detection of inductive commutation in programmable logic controller (PLC) diagnosis. FIG. 2 shows a circuit diagram of one embodiment of the system of FIG. 1. Inductive commutation is detected. The inductive commutation detection is used to control the timing of processing of diagnostic measurements and/or the measurements.

The system includes the PLC 24, output driver 36, output 28, power source 32, detection circuitry 34, processor 38, and inductive commutation detection circuit 26. The load 30 is shown for reference. Additional, different, or fewer components may be provided. For example, the load 30 is not provided or is added as part of the system.

The power source 32, output driver 36, output 28, inductive commutation detection circuit 26, processor 38, and detection circuitry 34 are part of the PLC 24, but are shown separately for discussion. Alternatively, one or more of these components is provided separate from the PLC 24, such as in a different housing or spaced by inches, feet, yards, or more from the PLC 24.

FIGS. 1 and 2 show one channel or output 28 and corresponding load 30. In other embodiments, the PLC 24 or associated expansion module include a plurality of outputs 28. Similarly, separate loads 30 connect or are connectable with the outputs 28. The induction commutation detection circuit 26, diagnosis detection circuit 34, and/or power source 32 are multiplexed between the different outputs. Alternatively, separate components are provided for each channel or output.

The PLC 24 includes the processor 38, such as a central processing unit. The processor 38 is a general processor, application specific integrated circuit, field programmable gate array, digital circuit, analog circuit, combinations thereof, or now know or later developed processor. The PLC 24 includes data busses and interfaces for communicating with panels, computers, actuators, and/or sensors. The PLC 24 has a housing or is housed in a panel, cabinet or other device.

The PLC 24, based on software and/or hardware, controls operation of one or more devices or processes. The outputs 28 are for control of industrial machinery. For example, the PLC 24 operates a plurality of loads 30 used in industrial processes. Example loads 30 include pressure, temperature, force, position, light, humidity, optical, or other sensors for monitoring an industrial process or equipment. As another example, the loads 30 include pneumatic, hydraulic, electric, or other sources of force (e.g., motors, valves, or actuators) for changing the industrial process or equipment operation. Some example industrial machinery includes machinery of power facilities, chemical plants, manufacturing facilities, heat and ventilation systems, air conditioning systems, fire safety systems, reactors, or other collections of interacting parts. In other examples, the industrial machinery includes specific units, such as a cutting machine, a pressing machine, a robot, a tank, a vehicle, or any other device.

The PLC 24 has the output 28 for connecting with the load 30. The output 28 is a port of an interface for connection. The output 28 is a physical connector, such as a male or female connector, and corresponding electrical interface. Other connectors may be used. A wire may extend from the output 28 to connect with the load 30.

During installation, the output 28 is connected with the load 30. The PLC 24 may be programmed to control the specific load 30 at the specific output 28. Each output 28 is independently operated for the respective load 30. Physical and electrical separation allows independent control. In alternative embodiments, a shared connection is used, such as multiple loads 30 connected to a same output 28. Addressing or other mechanism distinguishes between control signals for the different loads 30 sharing the output 28, or the same control is used for all connected loads 30.

The output 28 provides electrical signals in a digital or analog format. For example, a digital output 28 connects with the respective load 30. The load 30 operates based on the signals on the digital output. In one embodiment, each output is of a binary signal of either zero volts or 24 volts. Other voltages may be used. The output 28 cycles between the voltages to control the load 30. For example, a motor is either turned on or off. Other formats may be provided, such as providing digital words or control signals with other than binary information.

The output 28 connects with the central processing unit 38. Leads or traces of the central processing unit control the output driver 36 connected to the output 28. In alternative embodiments, an expansion buss or module is used. The central processing unit 38 controls the output driver 36 of the expansion module through a buss. The expansion buss connects with the central processing unit 38 and the output 28.

Any number of outputs 28 may be used. In one embodiment, the outputs 28 are grouped into groups of four. Multiple groups of four outputs 28 are used for a given PLC 24. In other embodiments, other size groups with or without multiple of the groups are used.

The PLC 24 includes the output driver 36 connected with the output 28. The output driver 36 is a circuit, pulser, logic, digital-to-analog converter, or other device for providing a voltage or current signal on the output 28. The output driver 36 controls operation of the load 30 based on controls from the PLC 24. In one embodiment, the output driver 36 is a field effect transistor (FET). The FET is connected to switchably connect the output 28 with a high voltage or high voltage rail (e.g., 24 volts) when on and otherwise connect the output 28 to ground or disconnect the output 28 (e.g., allow the output 28 to float). Turning the output driver 36 off connects the output to ground or opens the circuit. The central processing unit 38 turns the output drivers 36 on or off. Other transistors, switches, or circuits of transistors may be used.

Due to the load 30, the output 28, and/or the wire connecting the output 28 to the load 30, the connection may fail. The connection may short-to-ground (e.g., overload) or short-to-high voltage. The connection may be disconnected (i.e., open circuit). Other failures are possible, such as drawing current in an undesired manner (e.g., failure of a capacitor or inductor for phase balancing).

To detect such a failure, the power source 32 and detection circuit 34 are provided. Additional, different, or fewer components may be used for diagnosis of any failures.

The power source 32 is a voltage or current source. In one embodiment, the power source 32 is a current source providing current at a level insufficient to activate or control the load 30. For example, the current source provides current in the micro amp range (e.g., 1-9 micro amps). The load is operated with at least 1-10 milliamps. Other values may be provided, such as a load using 1-20 amps and the power source 32 providing less than one amp (e.g., milli or micro amp range). When the power source 32 provides current for diagnosis of the connection, the load 30 does not respond as if being controlled (e.g., not turned on or off). Alternatively, the diagnostic test is performed based on the power provided by the output driver 36.

The diagnostic detection circuit 34 is a voltage, current, resistance, capacitance, or inductance measuring circuit. Alternatively, the diagnosis detection circuit 34 is a frequency analyzer for extracting one or more characteristics of a response to a waveform or power from the power source 32. Any of resistors, capacitors, inductors, transistors, amplifiers, comparators, digital devices, analog devices, filters, processors, latches, or combinations thereof may be used. The diagnosis detection circuit 34 is a hardware-only circuit implementation (e.g., implementations in only analog and/or digital circuitry) or is a combination of circuits and software (and/or firmware).

The diagnostic detection circuit 34 is a single detection circuit for a given diagnostic. For example, the detection circuit 34 measures a voltage to detect a short-to-ground. In other embodiments, the single detection circuit 34 is used for different diagnoses. For example, voltage is measured. The level, change, or other characteristic of the voltage is used to detect multiple types of failure (e.g., short-to-ground, short-to-power, and open circuit). In yet other embodiments, the diagnosis detection circuit 34 includes separate circuits, with or without shared components, for detecting different types of failure. The diagnosis detection circuit 34 may be a collection of circuits.

In one embodiment, the diagnosis detection circuit 34 is a voltage detector. A comparator (e.g., differential amplifier) has one input connected to the output 28 and another input connected to a reference voltage. The reference voltage is a threshold for determining whether the voltage at the output 28 indicates failure or not. Alternatively, a voltage divider or silicon logic may be used to determine the voltage or voltage difference. In one example embodiment, the comparator is operable to determine a short-to-ground when the output driver is off (e.g., zero volts). In other embodiments, the diagnosis is made with the voltage driver on.

The diagnosis detection circuit 34 is configured to detect a short-to-ground, a short-to-driving voltage, and/or an open circuit between the output and respective load. The result of the measurement (e.g., the voltage difference output from a differential amplifier, a binary output from a comparator, or other measure) is processed to determine the diagnosis. The central processing unit 38 uses the instantaneous measurement, the measurement over time, or other characteristic of the measurement to determine whether or not a failure has occurred. For example, a voltage at the high voltage power level while the output driver is off indicates a short-to-power. As another example, a zero or low voltage may indicate a short-to-ground. In yet another example, a failure to draw current to the load 30 may indicate an open circuit. In other embodiments, the output of the detection circuit 34 alone indicates failure or not without further processing.

The inductive commutation detection circuit 26 detects inductive commutation. When the output driver 36 turns off, inductance in the load 30 may cause a residual voltage. For example, turning a 24 volt on to substantially 0 volt off may result in an about −60 volt peak, exponentially decaying voltage at the output 28. Substantially accounts for any transistors or other components contributing an off-set from 0 volts, such as a 0.7 volt diode. About is used as the inductive commutation may be greater or lesser due to the type of inductance, amount of inductance and other characteristics of the load 30, the connection, and the output driver 36. The inductive commutation may be positive and/or have various other characteristics (e.g., oscillating about the "off" voltage rather than exponential decay).

The inductive commutation detection circuit 26 operates when or after the output driver 36 is turned off. The inductive commutation detection circuit 26 may detect at other times with the measurements being ignored or used for other purposes (e.g., diagnostic). The measurements may be triggered such that only one measurement is made in response to the output driver 36 being turned off. A series of measurements may be made over a period, such as starting in response to the off state and continuing periodically or as triggered by the cycle flow until a period has past or until no inductive commutation is detected. Alternatively, the inductive commutation detection circuit 26 continues to operate.

The inductive commutation detection circuit 26 is a voltage detector. An arrangement of resistors, capacitors, inductors, diodes, transistors, comparators, amplifiers, other analog components, other digital components, or combinations thereof may be used. The inductive commutation causes a voltage at the output 28. The voltage detector is arranged to detect the voltage at the output. In alternative embodiments, a current detector, inductance detector, or other detector is used.

In one embodiment shown in FIG. 2, the inductive commutation detection circuit 26 includes a diode, a voltage amplitude detector, and a transistor. Additional, different, or fewer components may be used.

The diode D1 is arranged to block positive voltage and allow passing of negative voltage. The direction of the diode as connected to the output 28 passes negative voltages. If the output 28 is connected to an inductive load as the output driver 36 is switched off, the output voltage goes negative. The diode detects the negative voltage since the diode only conducts when the output 28 is negative.

The voltage amplitude detector is shown as a zener diode D2. Other voltage amplitude detectors may be used, such as a voltage divider, comparator, transistor network, or analog-to-digital converter. The voltage amplitude detector connects with the diode D1 to detect the amplitude of any passing negative voltage. The zener diode D2 sets the threshold for detecting a specific level or greater of negative voltage. For example, the threshold may be greater magnitude than −3, −5, or other voltage.

The transistor Q1 is a PNP transistor, but other transistors may be used. The resistors R1-R3 are biasing resistors for the PNP transistor. The gate of the transistor connects with the voltage amplitude detector. If a sufficient magnitude of voltage is detected, the transistor is turned on. When the voltage at the output 28 exceeds the negative voltage threshold, the transistor conducts. The source of the transistor is connected with a voltage source or rail, such as a 5 volt or other voltage for digital signals. When the transistor is turned on, this "high" voltage is supplied at the drain of the transistor. The inductive commutation detection signal is forced to voltage V of the voltage source. When the transistor is off, the voltage V is not provided on the output. Instead, the output floats or is not sourced to power. The drain is the output of the inductive commutation detection circuit 26.

The processor 38 is configured by software and/or hardware to respond to detected inductive commutation. The voltage high (V) or voltage low (no voltage) is received from the inductive commutation detection circuit 26. This signal indicates whether or not there is inductive commutation when timed with the state change of the output driver 36. The processor 38 controls operation of the output driver 36.

The processor 38 performs diagnosis of the connection with the load 30 to the output 28. The diagnosis is performed once the inductive commutation dissipates. The reading of the diagnostic detection circuit 34 is delayed in response to the detection of the inductive commutation. The delay is a processing delay by the processor 38, such as not using any measurements during the delay period. The delay may alternatively be for taking the measurements. The processor 38 controls the timing for operation of the diagnostic detection circuit 34.

The processor 38 initiates the reading of the diagnostic detection circuit 34 when the inductive commutation detection circuit detects no inductive commutation. Once the negative voltage at the output 28 drops below the threshold magnitude level, the diagnostic delay is over and the diagnostic processing begins. If no inductive commutation is originally detected, the diagnostic processing begins in response to the output driver 36 turning off. The lack of inductive commutation indicates a non- or small inductive load. In an alternative embodiment, a timer delay is used. If inductive commutation is detected, then the diagnosis is delayed for a period, such as an amount of time for dissipation from the highest rated inductance for the output 28. Assuming the load 30 is at or below the rated inductance for the output 28, the voltage from any connected load 30 with a lesser inductance dissipates within the period established for the maximum inductance.

The processor 38 acts upon the results of any diagnostic measurements once the inductive commutation ceases. For example, the processor is configured to react to a short-to-ground detection of the diagnostic detection circuit 34. For a short-to-ground, the processor 38 prevents driving of the output drivers 36 until a repetition of the diagnostic measurement indicates no overload. An event or warning may be sent so that someone may examine the connection and replace any wire or the load 30. The processor 38 provides a diagnostic event for the PLC 24 or causes the PLC 24 to send a notification to a panel or supervisory computer.

The processor 38 is the central processing unit of the PLC 24 or a separate processor. The processor 38 may be implemented in various forms of hardware, software, firmware, special purpose processors, or a combination thereof. Some embodiments are implemented in software as a program tangibly embodied on a non-transitory program storage device. By implementing with a system or program, inductive commutation testing, diagnostic testing, multiplexing, and/or updates of output drivers 36 may be provided as part of diagnostic checking of connections to the PLC 24.

The processor 38 is part of a panel, PLC, computer, personal computer, server, workstation, network processor, or other now known or later developed processing system. Various peripheral devices such as, for example, a display, a disk storage device (e.g., a magnetic or optical disk storage device), a keyboard, a printing device, and a mouse, may be operatively coupled to the processor 38. A program may be uploaded to, and executed by, the processor 38 comprising any suitable architecture. Likewise, processing strategies may include multiprocessing, multitasking, parallel processing and the like. The processor 38 is implemented on a computer platform having hardware, such as one or more central processing units (CPU), a random access memory (RAM), and input/output (I/O) interface(s). The computer platform also includes an operating system and microinstruction code. The various processes and functions described herein may be either part of the microinstruction code or part of the program (or combination thereof) which is executed via the operating system. Alternatively, the processor 38 is one or more processors in a network.

The instructions, user input, rules, and/or other information are stored in a non-transitory computer readable memory. The memory is an external storage device, RAM, ROM, and/or a local memory (e.g., solid state drive or hard drive). The same or different computer readable media may be used for the instructions and other data. The memory may be implemented using a database management system (DBMS) managed by the processor 38 and residing on a memory, such as a hard disk, RAM, or removable media. Alternatively, the memory is internal to the processor 38 (e.g. cache). The memory stores events, control processes, and/or operation processes.

The functions, acts or tasks illustrated in the figures or described herein are executed in response to one or more sets of instructions stored in or on computer readable storage media. The functions, acts or tasks are independent of the particular type of instructions set, storage media, processor or processing strategy and may be performed by software, hardware, integrated circuits, firmware, micro code and the like, operating alone or in combination. Because some of the constituent system components and method steps depicted in the accompanying figures are preferably implemented in software, the actual connections between the system components (or the process steps) may differ depending upon the manner in which the present embodiments are programmed.

The detection circuit 34, induction commutation circuit 26, and/or the power source 32 are connected with the output 28. For applying the power, detecting commutation and diagnosing the connection, a direct connection is provided. In other embodiments, the connection is indirect, such as through one or more other components. The connection may be fixed. Alternatively, the connection is multiplexed or switched. The detection circuit 34, induction commutation circuit 26, and/or the power source 32 are connectable to the output 28, but connected when needed and otherwise disconnected. For example, a multiplexer (e.g., solid state relays) connects the same induction commutation detection circuit 26, power source 32, and diagnostic detection circuit 34 to different outputs at different times.

Figure 3:
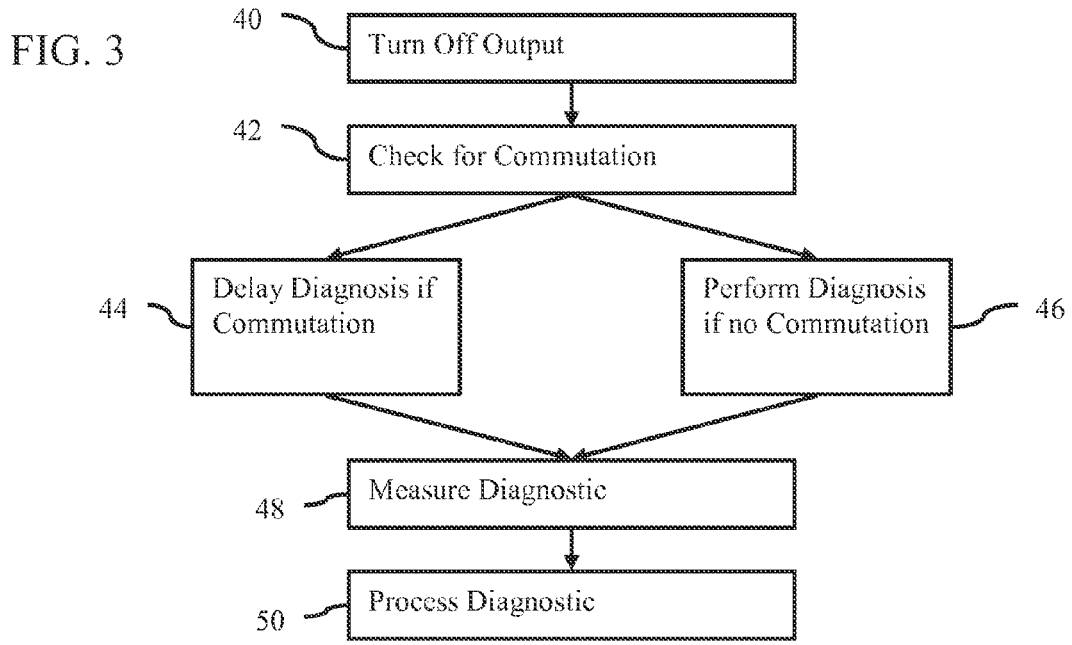
FIG. 3 is a flow chart diagram of one embodiment of a method for detection of inductive commutation for PLC diagnosis.
Figure 4:
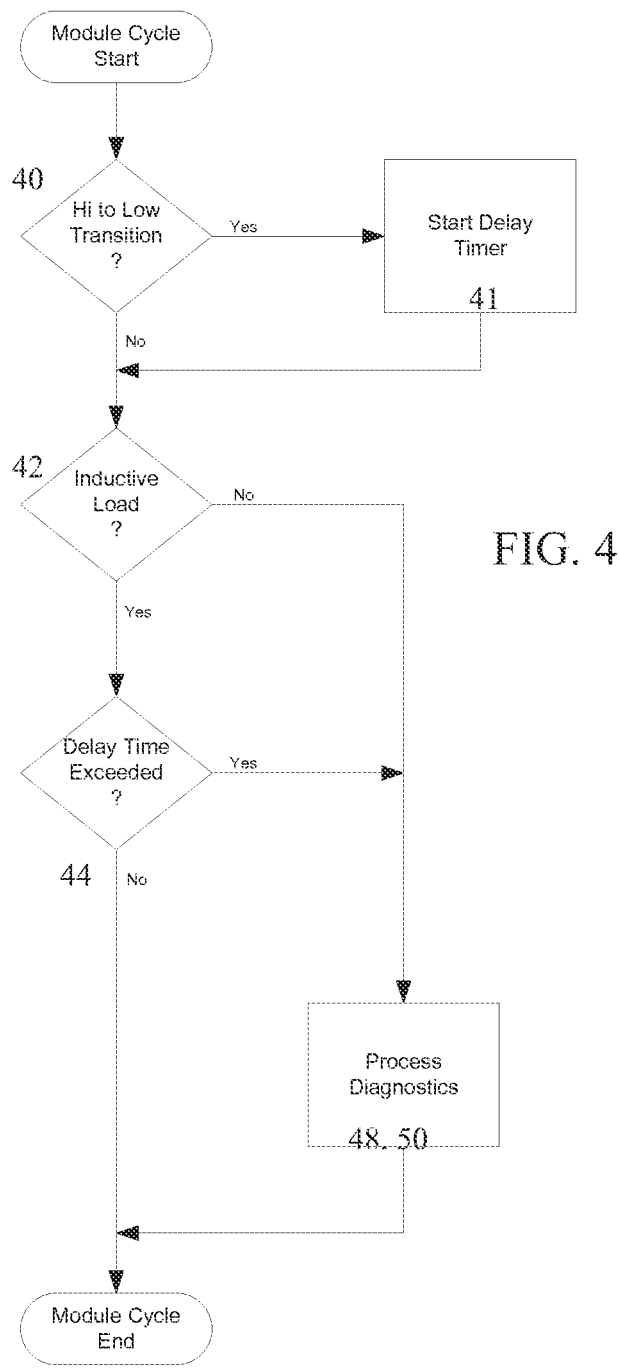
FIG. 4 is a flow chart diagram of another embodiment of a method for detection of inductive commutation for PLC diagnosis.

FIG. 3 shows a method for detection of inductive commutation for programmable logic controller (PLC) diagnosis. FIG. 4 shows another embodiment of the method. The diagnostics are timed relative to inductive commutation. The process switches between inductive load diagnostic processing and non-inductive load diagnostic processing.

The methods are implemented by the system of FIG. 1, the circuit of FIG. 2, and/or other systems or circuits. The method is provided in the order shown, but other orders may be provided. Additional, different or fewer acts may be provided. For example, the delay timer act 41 and delay time act 44 of FIG. 4 are not provided.

In act 40, the output to a load is transitioned from an on state to an off state. The load is supplied with a relatively high voltage (e.g., 24 volts). The supply is switched to a relatively low voltage (e.g., 0 volts). For example, a field effect transistor is turned off so that the output is disconnected from a voltage source.

By switching the output of the PLC off, any inductance of the load generates an inductive commutation. Charge stored in the inductor or inductive components of the load discharges, causing a negative voltage. Any level of inductive commutation may be provided, such as a magnitude greater or less than the voltage source.

The occurrence of the transition is detected or known. For example, a processor causes the transition. The processor thus knows of the transition. Alternatively, a voltage is measured at the output driver. When the voltage drops to the "off" state level, the transition is detected.

In the embodiment of FIG. 4 showing act 41, a delay timer is started in response to the transition. The delay time counts down or up. The delay time is used with a period for dissipation of inductive commutation. For example, the output of the PLC is rated to connect with an inductive load with an inductance at or below a level. Larger inductances may take longer to dissipate. The maximum or rated inductance indicates the period for delay, such as 100-600 milliseconds. This timer delay for a count down is determined by the maximum inductive load allowed for the output. The timer delay for counting up may be a threshold time monitored by a processor.

In act 42, the output is checked for inductive commutation. In response to the transition of act 40, the output is checked. If the load is inductive, inductive commutation occurs. The check may be for a threshold level of inductive commutation. If sufficiently large inductive commutation occurs, then inductive commutation is detected. If relatively small inductive commutation occurs, the output may be treated as if no inductive commutation is detected. If the load is not inductive or has a small inductance, inductive commutation may not occur or occurs at a level insufficient to effect diagnostic measurements.

The inductive commutation is detected by measuring a voltage level. For example, a negative or opposite voltage level (e.g., positive if the output driver drives with a negative voltage) is measured. If the magnitude of the voltage is above a threshold, then inductive commutation is detected. The current may be measured instead of the voltage. As an alternative to measuring the commutation, the inductance of the load may be measured before or after the transition.

The measurement of inductive commutation is performed within a short time of the transition. For example the check is performed within ten milliseconds of the transitioning. Other periods may be used, such as fifty milliseconds.

The check determines whether measurement and/or processing of the diagnostic or diagnostics is to be delayed. In act 44, the diagnosis is delayed when inductive commutation is detected. The voltage from the inductive commutation may result in improper diagnostic measurements.

The delay is of the measuring in act 48. The measurements in act 48 are not performed during the delay. Alternatively or additionally, the delay is of the processing of act 50. The measuring of act 48 may occur during the existence of the inductive commutation on the output, but the resulting values are not processed to determine failure. The values may be erroneous. The processing is delayed until the measured values are not at risk of being erroneous due to the inductive commutation.

In the embodiment of FIG. 3, the check of act 42 is repeated until the inductive commutation dissipates sufficiently to avoid introducing error in the diagnostic measurements. The check is repeated continuously or periodically, such as once every process cycle. Based on the voltage level measured for checking for inductive commutation, the diagnostic measurements or processing may continue as soon as the inductive commutation has dissipated and without waiting for a time associated with a maximum rated inductance. With periodic checking, some further delay may be introduced, but still less than waiting a full period of possible inductive commutation.

In the alternative embodiment of FIG. 4, the delay timer is used to determine the period of delay. The timer is monitored or the delay is provided until the timer indicates completion of the delay period. The delay period is predetermined, such as for the maximum rated load of the output or a known inductance of a given load. The user may set the predetermined time, such as setting the time based on a characteristic of the load to be attached.

If the delay time has been exceeded, the diagnostic measurement and/or processing may begin. The module cycle completes and other processing may occur. For example, the module cycle is repeated. The module cycle may include other actions, such as control of the output driver and/or event processing.

If the delay time has not been exceeded, the delayed operation is continued. The timer may continue to time the delay while the process moves forward with other cycles. The other cycle may be performing other actions than switching the output driver.

In act 46 (FIG. 3), diagnosis is performed without waiting for inductive commutation to dissipate. When no inductive commutation is detected, the diagnostics may begin or occur without waiting for the possibility of inductive commutation. For example, loads without inductors may be operated or controlled at a greater rate since the risk of inductive commutation is not dealt with through delay. The diagnostic processing may be performed prior to a time for dissipation of a rated maximum load inductance of the output. For example, the diagnostic measurements and/or processing are performed within one hundred milliseconds of the transitioning of act 40 rather than waiting 200-600 milliseconds. Diagnostics may be processed immediately.

In act 48, a diagnostic of the output is measured. The measurement is performed for fault detection. Any type of diagnosis may be made. For example, the measurement is to detect a short-to-ground, a short-to-power, a disconnected load, or combinations thereof. In one embodiment, one or more measurements are made to detect two or more different types of fault. For example, different measurements are made to detect three different faults. Based on the type of measurement (e.g., voltage), the instantaneous value, a difference value, a change over time, or other processing of the measurement is used to indicate failure or not. For example, being above or below a threshold indicates failure.

To measure in one embodiment, a current is applied to the load. A current source applies a current insufficient to activate the load. The current is from a different source than used to drive the output for controlling or operating the load. Alternatively, the same current source used to drive the load is also used for diagnosis. In yet other alternatives, a voltage or other power source than a current source is used.

The voltage is tested for diagnostics. The load response to the application of the power (e.g., current) is measured. A diagnostic test is performed by measuring the voltage. Other measurements may be used, such as current or other characteristics of the load response to the application of power. The measurements may be instantaneous or over time (e.g., averaged or a characteristic of a change).

In act 50, the measured diagnostic is processed. The measurement itself may be diagnostic. For example, the measurement is binary where one state represents failure. The processing is then reading and dealing with the measurement. Alternatively, the measurement is processed to diagnose any failure. For example, the measured voltage is compared to a threshold, tracked over time, or otherwise processed to determine the state of the connection between the output and the load. After processing to determine a value for the measured diagnostic, the processing is then reading and dealing with the measurement.

The measured diagnostic is used to determine whether to trigger a diagnostic event. The measured value is compared to a threshold or flag (e.g., binary indication of failure or not). If the diagnostic indicates a failure, then an event is triggered. If the diagnostic indicates no problem, then the process continues to another cycle of the output driver.

Various improvements described herein may be used together or separately. Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. A system for detection of inductive commutation for programmable logic controller (PLC) diagnosis, the system comprising:

an output driver connected with an output of the PLC;
a diagnostic detection circuit connectable or connected with the output;
an inductive commutation detection circuit connected with the output, the inductive commutation detection circuit operable to detect the inductive commutation in response to the output driver turning off, wherein the inductive commutation is a negative voltage having greater than a threshold amplitude; and
a processor configured to delay reading of the diagnostic detection circuit in response to the detection of the inductive commutation and to initiate the reading of the diagnostic detection circuit when the inductive commutation detection circuit detects no inductive commutation.

2. The system of claim 1 wherein the output driver comprises a transistor operable to connect the output to first voltage and a ground voltage, the off being at the ground voltage.

3. The system of claim 1 wherein the output comprises a digital output operable to be connected with a load.

4. The system of claim 1 wherein the diagnostic detection circuit comprises a current source and a voltage detector.

5. The system of claim 1 wherein the diagnostic detection circuit is configured to detect a short to ground, a short to a driving voltage, and an open circuit between the output and a respective load.

6. The system of claim 1 wherein the inductive commutation detection circuit comprises:
- a diode arranged to prevent passing of positive voltage and allow passing of negative voltage;
- a voltage amplitude detector connected with the diode;
- a transistor operable to connect a first voltage to a commutation output, the commutation output indicating the inductive commutation when the first voltage is connected to the commutation output due to detection of the negative voltage of the threshold amplitude by the voltage amplitude detector.

7. The system of claim 1 wherein the inductive commutation detection circuit comprises a voltage detector arranged to detect a voltage at the output due to inductance of a load.

8. The system of claim 1 wherein the processor is configured to perform diagnosis of a connection with a load at the output once the inductive commutation due to inductance of the load dissipates.

9. A method for detection of inductive commutation for programmable logic controller (PLC) diagnosis, the method comprising:
- transitioning an output to a load from a high state to a low state;
- checking, in response to the transitioning, for the inductive commutation at the output in response to the transitioning by detecting a negative voltage with greater than a threshold magnitude at the output;
- measuring a diagnostic of the output after the checking;
- processing the measured diagnostic;
- delaying the measuring, the processing, or the measuring and the processing when there is inductive commutation at the output; and
- performing the processing of the measured diagnostic without the delaying when there is substantially no inductive commutation at the output.

10. The method of claim 9 wherein transitioning comprises turning off a field effect transistor such that the output is disconnected from a voltage source.

11. The method of claim 9 wherein checking comprises checking within ten milliseconds of the transitioning.

12. The method of claim 9 wherein measuring comprises applying a current source and measuring a voltage.

13. The method of claim 9 wherein measuring comprises measuring for a short to ground, a short to power, a disconnected load, or combinations thereof.

14. The method of claim 9 wherein measuring comprises measuring after the delaying, and wherein delaying comprises delaying the measuring and the processing.

15. The method of claim 9 wherein measuring comprises measuring during the delaying, and wherein delaying comprises delaying the processing.

16. The method of claim 9 wherein processing comprises determining whether to trigger a diagnostic event.

17. The method of claim 9 wherein performing the processing of the measured diagnostic without the delaying when there is substantially no inductive commutation at the output comprises performing within one hundred milliseconds of the transitioning.

18. The method of claim 9 wherein performing comprises performing the processing prior to a time for dissipation of a rated maximum load inductance of the output.

19. The method of claim 9 further comprising:
- starting a timer at the transitioning;
- wherein delaying comprises delaying for a predetermined period using the timer.

20. A method for detection of inductive commutation for programmable logic controller (PLC) diagnosis, the method comprising:
- switching an output of the PLC off;
- detecting a voltage level from a load at the output of the PLC in response to the switching off; and
- timing diagnosis of connection of the output to the load as a function of the voltage level.

\* \* \* \* \*